United States Patent
Fitchett et al.

(10) Patent No.: US 8,537,659 B2
(45) Date of Patent: Sep. 17, 2013

(54) METHOD AND SYSTEM FOR REDUCING SERVICE INTERRUPTIONS TO MOBILE COMMUNICATION DEVICES

(75) Inventors: Jeffrey William Fitchett, Kanata (CA); Guy Michael Amyon Farquharson Duxbury, Nepean (CA); Kent Felske, Kanata (CA)

(73) Assignee: Apple Inc., Cupertino, CA (US)

( * ) Notice: Subject to any disclaimer, the term of this patent is extended or adjusted under 35 U.S.C. 154(b) by 1579 days.

(21) Appl. No.: 11/613,863

(22) Filed: Dec. 20, 2006

(65) Prior Publication Data

US 2008/0151817 A1 Jun. 26, 2008

(51) Int. Cl.
*H04J 1/16* (2006.01)
*H04J 3/14* (2006.01)

(52) U.S. Cl.
USPC ............ 370/216; 455/423; 455/424; 370/241

(58) Field of Classification Search
USPC .............. 455/423–425, 450–452.2, 436–441; 370/216–228, 241, 250, 252, 253
See application file for complete search history.

(56) References Cited

U.S. PATENT DOCUMENTS

| | | | |
|---|---|---|---|
| 6,907,243 B1 * | 6/2005 | Patel | 455/442 |
| 2005/0026618 A1 * | 2/2005 | Gehlot et al. | 455/440 |
| 2005/0063330 A1 * | 3/2005 | Lee et al. | 370/328 |
| 2007/0121551 A1 * | 5/2007 | Rouffet et al. | 370/332 |
| 2008/0294846 A1 * | 11/2008 | Bali et al. | 711/118 |

* cited by examiner

*Primary Examiner* — Ajit Patel
(74) *Attorney, Agent, or Firm* — Meyertons, Hood, Kivlin, Kowert & Goetzel, P.C.

(57) ABSTRACT

A method and system for monitoring context information associated with a wireless communication entity for determining a potential occurrence of a network disruption for that wireless communication entity. Upon determining a potential occurrence of a network disruption, causing an adjustment of bandwidth available for data transfer involving the wireless communication entity. The adjustment is used to prevent or mitigate service disruptions.

73 Claims, 6 Drawing Sheets

METHOD AND SYSTEM FOR REDUCING SERVICE INTERRUPTIONS TO MOBILE COMMUNICATION DEVICES

FIELD OF THE INVENTION

The present invention relates generally to the field of mobile communication systems, and more specifically to systems and methods for reducing perceivable service interruptions to mobile communication entities during network disruptions.

BACKGROUND OF THE INVENTION

Existing mobile communications systems are made up of multiple wireless networks that are managed by different network service providers. There are often situations when traveling geographically, where a mobile phone, or other portable communication device, will encounter an area of network disruption. For example, the portable communication device may enter an area of no-coverage, such as within a tunnel. Likewise, as a mobile communication device moves from a region controlled by one network to a region controlled by another network, there is also the chance that there will be a period of network disruption as the two networks coordinate the handoff procedure. The handoff time can often be too long in duration to allow for seamless handoffs, wherein there is no perceivable interruption of data services for the user. The long handoff periods are not only due to signal drops, but can also be due to network access, authentication, authorization, security mechanisms and service parameter negotiations.

It has been a goal of many service providers to provide for seamless handoffs (i.e. no discernible interruption by a user) of data transfer, during network transitions. However, in practice this has proven to be quite difficult. This is partially due to problems like "blackhole" which is RF signal dropping during transition, and "ping-ponging" which is an unclear decision as to which network to connect to.

The effects of a network disruption perceived by a user can vary depending on service type and the extent of the disruption. In the case of a fully error corrected data transfer with retransmission capabilities, most disruptions will just map to a delay in the delivery of that data. In the case of voice or video data flows, however, where delay is important, error correction algorithms have a limited ability to handle lost data, and retransmission is impractical due to continuously following order sensitive data. Any disruption of a duration longer than corresponds to the levels of data currently stored on the receiving side of the communication link will result in missing or corrupted data. In the case of video this may manifest itself to the user as visible artifacts. In the case of voice it may manifest itself as an audible click or a noticeable loss of content. Worse still, large disruptions may extend beyond a communications link protocol timeout period, such that the complete data transfer process may be terminated and require to be restarted either automatically or manually. Interruptions with noticeable effects to the user, especially those requiring a manual restarting of a service, lead to significant user dissatisfaction and are one of the leading reasons users switch mobile service providers.

In addition, for some services, the data to be downloaded or streamed is time-sensitive and dynamic. That is, the data to be downloaded is not known and cannot be made available at the portable communication device until a short period before the data is desired by the user. Where multiple transactions between a user and a data service provider are required, even delays in the order of seconds can render the service unacceptable to a user.

In light of the above, it can be seen that there is a need in the industry for an improved system for reducing perceivable service interruptions to mobile communication devices during network disruptions while keeping delays small.

SUMMARY OF THE INVENTION

In accordance with a first broad aspect, the present invention provides a method comprising monitoring context information associated with a wireless communication entity for determining a potential occurrence of a network disruption and upon determining a potential occurrence of a network disruption sufficient to degrade a user's service, causing adjustment of bandwidth available for data transfer involving the wireless communication entity.

In accordance with a second broad aspect, the present invention provides a predictive context engine comprising, an input, a processing unit and an output. The input is operative for receiving over a network a first signal indicative of context information associated with a wireless communication entity. The processing unit is operative for processing the first signal indicative of context information associated with the wireless communication entity to determine the potential occurrence of a network disruption to the wireless communication entity, and the output is operative for issuing a second signal for causing adjustment of bandwidth available for data transfer involving the wireless communication entity, upon determining a potential occurrence of a network disruption.

In accordance with a third broad aspect, the present invention provides a system comprising a wireless communication entity and a predictive context engine. The wireless communication entity comprises a transceiver suitable for establishing a wireless communication link for permitting data transfer between a network and the wireless communication entity. The predictive context engine comprises an input for receiving over a network at least one signal indicative of context information associated with the wireless communication entity, a processing unit for processing the signals indicative of the context information associated with the wireless communication entity and its services to determine the potential occurrence of a network disruption involving the wireless communication entity, and an output for issuing a signal for causing adjustment of network bandwidth available for data transfer involving the wireless communication entity, upon determining a potential occurrence of a network disruption.

In accordance with a fourth broad aspect, the present invention provides a wireless communication entity that comprises means for establishing a wireless communication link for permitting data transfer between a network and the wireless communication entity, means for issuing over a network, a signal from which context information associated with said wireless communication entity can be derived and means for receiving an adjustment of bandwidth available for data transfer with the network upon a determination from the context information of a potential occurrence of a network disruption to the wireless communication entity.

In accordance with a fifth broad aspect, the present invention provides a method, comprising monitoring context information associated with a wireless communication entity for determining a potential occurrence of a network disruption. Upon determining the potential occurrence of a network disruption, the method involves predicting future data that may be desired by the wireless communication entity and causing an increase in the bandwidth available for data transfer involving the wireless communication entity such that the predicted future data desired by the wireless communication entity is pre-emptively transferred to the wireless communication entity.

In accordance with a sixth broad aspect, the present invention provides a computer-readable storage medium comprising a program element for execution by a predictive context entity. The predictive context entity, when executing said program element, being operative for receiving over a network a signal indicative of context information associated with the wireless communication entity, processing the signal indicative of the context information to determine the potential occurrence of a network disruption involving the wireless communication entity and upon determining a potential occurrence of a network disruption, issuing a signal for causing adjustment of bandwidth available for data transfer involving the wireless communication entity.

These and other aspects and features of the present invention will now become apparent to those of ordinary skill in the art upon review of the following description of specific embodiments of the invention and the accompanying drawings.

Other aspects and features of the present invention will become apparent to those ordinarily skilled in the art upon review of the following description of specific embodiments of the invention in conjunction with the accompanying figures.

DETAILED DESCRIPTION

Figure 1:
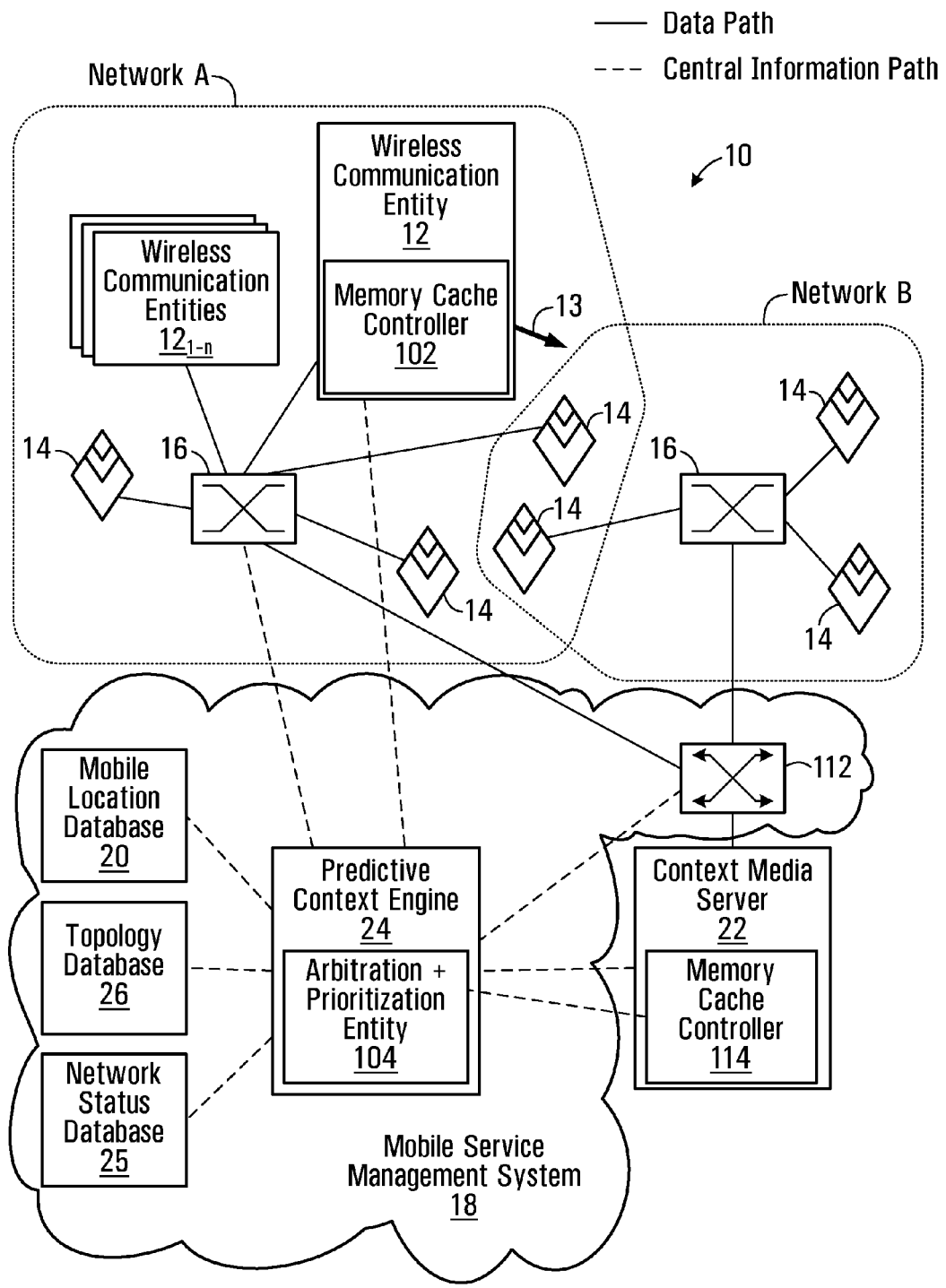
FIG. 1 shows a non-limiting representational drawing of a wireless communication system in accordance with a non-limiting example of implementation of the present invention.

Shown in FIG. 1 is a non-limiting representative diagram of a wireless communication system 10 in which two different networks, namely Network A and Network B, are operating. For the purposes of the present description, the two networks A and B are operated by two different wireless service providers, and are operative for providing wireless communication services to wireless communication entities 12 and $12_{1-n}$, located within the geographical boundaries of the networks. Although two networks A and B are shown in FIG. 1, it should be appreciated that the present invention can also be implemented within a single network.

For the sake of simplicity, the present invention will be described with reference to wireless communication entity 12, however, it should be understood that in reality, hundreds, if not thousands of wireless communication entities $12_{1-n}$ are located within each network, and can be provided with the same services as will be described below with respect to wireless communication entity 12. Likewise, although only two networks are shown in FIG. 1, it should be appreciated that any number of networks can be included within the wireless communication system 10, without departing from the spirit of the invention.

For the purpose of the present application, the term "wireless communication entity" encompasses cellular telephones, personal digital assistants (e.g. Palm®, etc.), smartphones (e.g. BlackBerry®), telephony enabled personal digital assistants and any other type of portable device capable of performing wireless data transfer over a network. The wireless communication entity 12 can be capable of telephonic communication, such as receiving incoming calls and originating outgoing calls, however a wireless communication entity 12 that is simply able to send and/or receive data content over the network is also included within the scope of the present invention. It should be appreciated that the data content may be streamed multimedia data, unidirectional or bidirectional data, or any other type of downloadable/uploadable data that is not necessarily streamed. For example, the data may be an interactive form or set of nested forms.

As shown in FIG. 1, the wireless communication entity 12 contains a memory cache controller 102. For the purposes of the present application, the memory cache controller 102 includes upstream egress queues, downstream ingress queues (which will be collectively referred to as the memory cache for the purposes of simplicity), as well as a control unit for coordinating the bandwidth provided to the wireless communication entity 12. In this manner, the memory cache controller 102 is able to control the inflow and outflow of data content to the memory cache. The upstream egress queues and downstream ingress queues forming the memory cache may be shared between all wireless services provided to the wireless communication entity 12 or may be separate for each service.

As shown, each of Networks A and B includes a plurality of base stations 14 that are operative for transmitting and receiving radio signals with the mobile communication entities 12 and $12_{1-n}$ located within their range of coverage. Each of Networks A and B also includes a base station controller 16 in communication with the base stations 14 for controlling handovers from base station to base station 14 as the mobile communication entity 12 travels within the network. Although only one base station controller 16 is shown in FIG. 1, each of Networks A and B may include a plurality of base station controllers.

For the purposes of this description, the data switching functions within each network are integrated within the base station controller 16. It should be appreciated that in the case where the wireless communication system 10 is a cellular network, the one or more base station controllers typically communicate with each other and are managed via a mobile switching center (not shown). In other wireless systems both the functions of the mobile switching centre (MSC) and the base station controller 16 may be integrated into the base stations 14. In such a scenario, each base station 14 would be communicated with, as though it was a separate network.

As shown in FIG. 1, the wireless communication entity 12 is in communication with both a data switching entity 112 and a predictive context engine 24 which form part of a mobile service management system 18. The dashed lines represent control information paths, and the solid lines represent data transfer paths. The data switching entity 112 is operative for switching data between wireless networks as the mobile communication entity 12 move from wireless network to wireless network and for interfacing with the Public Switched Telephone Network (PSTN) for connecting calls between plain old telephone systems (POTS) and the mobile communication entities 12 and $12_{1-n}$. In addition, the data switching entity 112 is operative for exchanging data content with the wireless communication entity 12 over the network. As shown, the data switching entity 112 is in communication with a content media server 22, which may be any server capable of providing data content (e.g. data content from CNN.com, iTunes, the NYSX etc.) to one or more wireless communication entities 12 over a service such as Wireless Application Protocol (WAP), MMS, WLAN, Mobile IPTV and the Internet.

In the embodiment shown, the data switch 112 is part of the mobile service management system 18, however, it should be appreciated that the data switching entity 112 may be separate from the mobile service management system 18, and instead by included at a network edge switch center, for example.

The content media server 22 includes a memory cache controller 114 for providing temporary data storage capability for traffic into and out of the wireless network. The memory cache controller 114 is typically configured to be similar to the memory cache controller 102 of the wireless communications entity 12, in that it includes ingress and outgress queues, as well as a control unit for coordinating the bandwidth provided to the wireless communication entity 12. Although the memory cache controller 114 is shown as being part of the content media server 22, it should be appreciated that it can be located in other regions of the network without departing from the spirit of the invention.

The mobile service management system 18 is responsible for managing data transfer between the mobile communication entity 12 and the content media server 22. In accordance with the present invention, and as will be described in more detail below, it is the predictive context engine 24 that is operative for monitoring context information associated with the wireless communication entity 12, and for causing an adjustment in the bandwidth available for data transfer with the wireless communication entity 12 upon determination of a potential network disruption to the wireless communication entity 12. To this end, the predictive context engine 24 is in communication with the wireless communication entity 12, the base station controller 16, the data switching entity 112, the context media server 22 and one or more databases. In the embodiment shown, the predictive context engine 24 includes an arbitration and prioritisation entity 104 for coordinating with the memory cache controllers 102 and 114 of the content media server 22 and the wireless communication entity 12 for controlling the prioritisation and arbitration of bandwidth supplied to the wireless communication entity 12. As is known in the art, an adjustment in bandwidth can be implemented by either adjusting the network priority or by improving the QoS provided to the wireless communication entity 12.

As shown in FIG. 1, the predictive context engine 24 is in communication with a topology database 26, a mobile location database 20, and a network status database 25. The topology database 26 includes information associated with geographical characteristics of the region covered by the wireless communication system 10. For example, the topology database 26 may include information indicative of regions of no-coverage, such as tunnels, as well as the boundaries associated with each of the networks A and B. The network status database 25 contains network configuration knowledge. The mobile status database 20 may be part of a home location register (HLR), for example, and includes information for facilitating the various switching operations and call control operations when the wireless communication entity 12 receives an incoming call, originates an outgoing call, is involved in a call in progress, or is performing data transfer over the network. The mobile location database 20 may also include information regarding the various communication services that may be subscribed to by the various wireless communication entity 12 located within the wireless communication system 10. A more detailed explanation of the purpose of each of these databases will be provided below.

Figure 2:
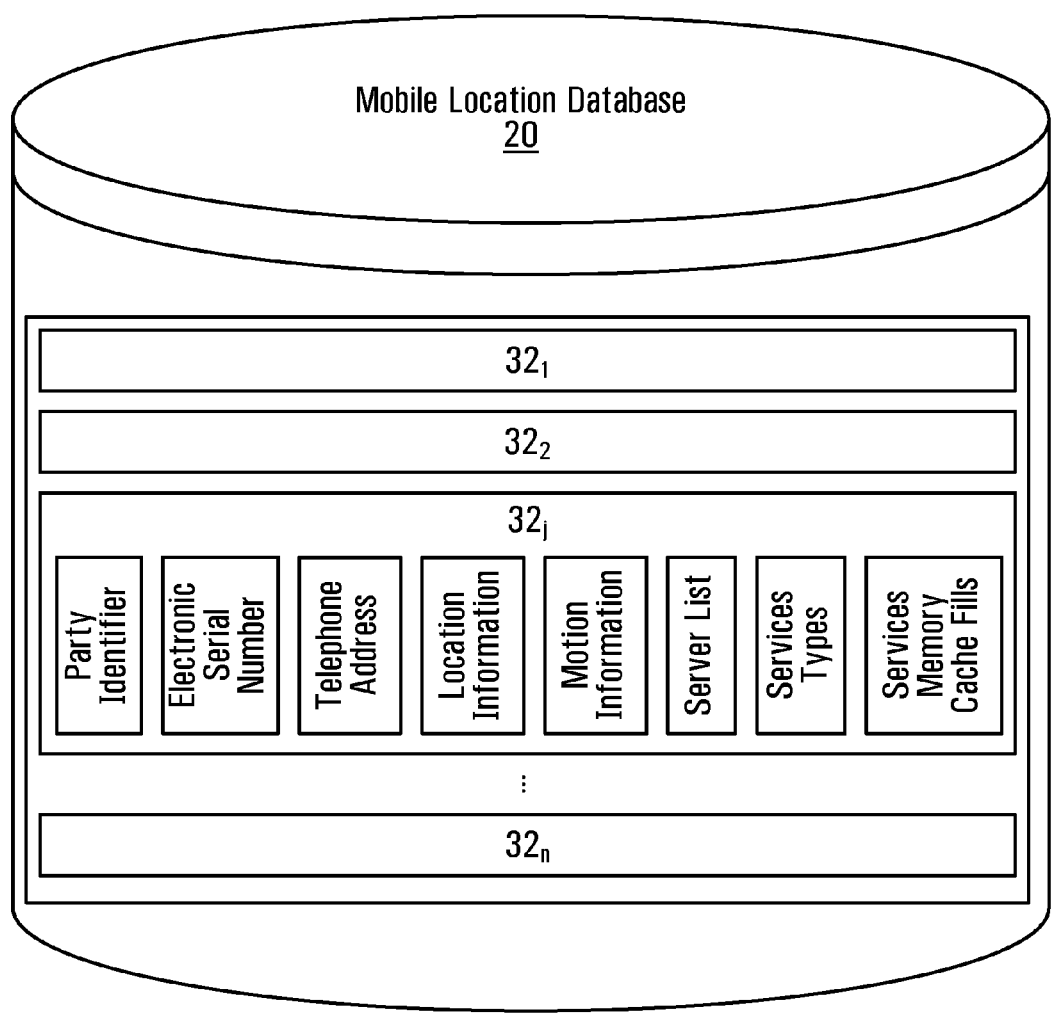
FIG. 2 shows a non-limiting example of potential contents of a first database in the wireless communication system of FIG. 1.

Shown in FIG. 2 is a non-limiting example of a mobile location database 20 that includes a plurality of entries associated with respective wireless communication entities 12 and $12_{1-n}$ located within the networks. In this non-limiting example, the mobile status database 20 stores a plurality of records $32_1 \ldots 32_N$ each comprising an identifier of the party associated with the respective one of the wireless communication entities 12 and $12_{1-n}$ (such as the user of wireless communication entity 12), an electronic serial number (ESN) and an associated subscriber telephone number for the wireless communication entity 12 (in the case where the wireless communication entity is telephony enabled). Each of the records $32_1 \ldots 32_N$ may further include an indication of a location of the respective wireless communication entity 12 associated with that record. The manner in which the database knows the current location of the wireless communication entity 12 will be described in more detail below. In accordance with a non-limiting example, this indication of location may be an indication of the current or most recent base station 14 serving that wireless communication entity 12. In order to maintain this information up-to-date, each wireless communication entity 12 can periodically emit an RF signal for identifying its location. The RF signal issued by the wireless communication entity 12 may include its ESN, or other identification information, such that the mobile status database 20 at the mobile service management system 18 can associate the wireless communication entity 12 with its current location.

Each of the records $32_1 \ldots 32_N$ may further include motion information, server list information, and a list of communication services subscribed to by the respective party associated with that record, or a list of user preferences relating to communication services. Non-limiting examples of such communication services can include calling line identification (CLID), voice mail, call forwarding, distinctive ringing, long distance call blocking, CLID blocking, etc. As will be described further on, in some cases, the user preferences associated with certain communication services include an indication as to whether or not the user would like to receive adjusted bandwidth in the case where there is the potential for a network disruption to that wireless communication entity 12. Finally, each of the records $32_1 \ldots 32_N$ may further include an indication of the fill level of the memory cache in the memory cache controller 102.

In accordance with the present invention, the wireless communication system 10 is operative for reducing the perceivable interruption to data content services provided to the wireless communication entity 12 when the potential occurrence of a network disruption for the wireless communication entity 12 is detected. This is achieved by monitoring context information associated with the wireless communication entity 12 so as to determine when a potential occurrence of a network disruption is likely to occur. Upon determination of a potential network disruption, the bandwidth available for data transfer between the wireless communication entity 12 and a network entity (such as the content media server 22) is adjusted.

The term "bandwidth" refers to the amount of data flow capable of being exchanged between a wireless communication entity and a network entity. For example, an increase in bandwidth will result in an increase in the rate of data content being exchanged between the wireless communication entity 12 and a network entity, and a decrease in bandwidth will result in a decrease in the rate of data content being exchanged between the wireless communication entity 12 and a network entity. Adjusting the bandwidth available to the wireless communication entity 12 may involve adjusting the wireless network link to and from the wireless communications entity 12 by temporarily adjusting the quality of serve (i.e. less packets dropped), or by giving the wireless communications entity 12 a different priority than it otherwise would have if a network disruption was unlikely. Methods for increasing the bandwidth to a given wireless communication entity are known in the art, and as such will not be described in more detail herein.

As will be explained in more detail below, an increase in bandwidth available for data transfer involving the wireless communication entity 12 can allow sufficient data content to be pre-cached by the memory cache controller 102 of the wireless communication entity 12 so as to provide continual data content to the user of the wireless communication entity 12 during a network disruption. This increases the degree to which the data content services provided to a wireless communication entity 12 appear seamless, even during temporary connectivity loss.

For the purposes of the present application, the term "network disruption" can refer to at least two types of situations. In a first non-limiting situation, a "network disruption" refers to any event that may lead to a loss of connectivity with a network entity, thus resulting in an interruption in data transfer between a wireless communication entity 12 and the network entity. Such an interruption may occur due to the wireless communication entity 12 moving into a no-coverage zone, wherein data transfer between the wireless communication entity and the network entity is not possible. This may occur as the wireless communication entity 12 moves into a tunnel, for example. Or an interruption may occur as the wireless communication entity 12 moves from one network to another, as a result of a bad handoff procedure.

In a second non-limiting situation, a "network disruption" can refer to any change in the network service that is being provided to the wireless communication entity 12. For example, when the wireless communication entity 12 moves from one network to another, the cost of receiving data content from the new network may increase, or the quality of the data content may decrease. These changes may be considered a "network disruption". Likewise, if the wireless communication entity 12 moves from one network to another, such that the availability of bandwidth is significantly less in the new network, this may also be considered a "network disruption".

A method for determining the potential occurrence of a network disruption, and for causing an adjustment in the bandwidth available to the wireless communication entity 12 in response to this determination, will now be described in more detail with reference to two possible scenarios. In accordance with a first non-limiting scenario, the method is performed substantially by the predictive context engine 24 that is located remotely from the wireless communication entity 12. Alternatively, the method can be performed by the wireless communication entity 12 itself. Each of these methods will be described in more detail below.

Method Performed by Predictive Context Engine

As described above, the predictive context engine 24 is operative for monitoring the context information associated with the wireless communication entity 12 located within the wireless communication system 10, and for causing an adjustment in the bandwidth available for data transfer involving the wireless communication entity 12 when a potential occurrence of a network disruption is detected.

Figure 3:
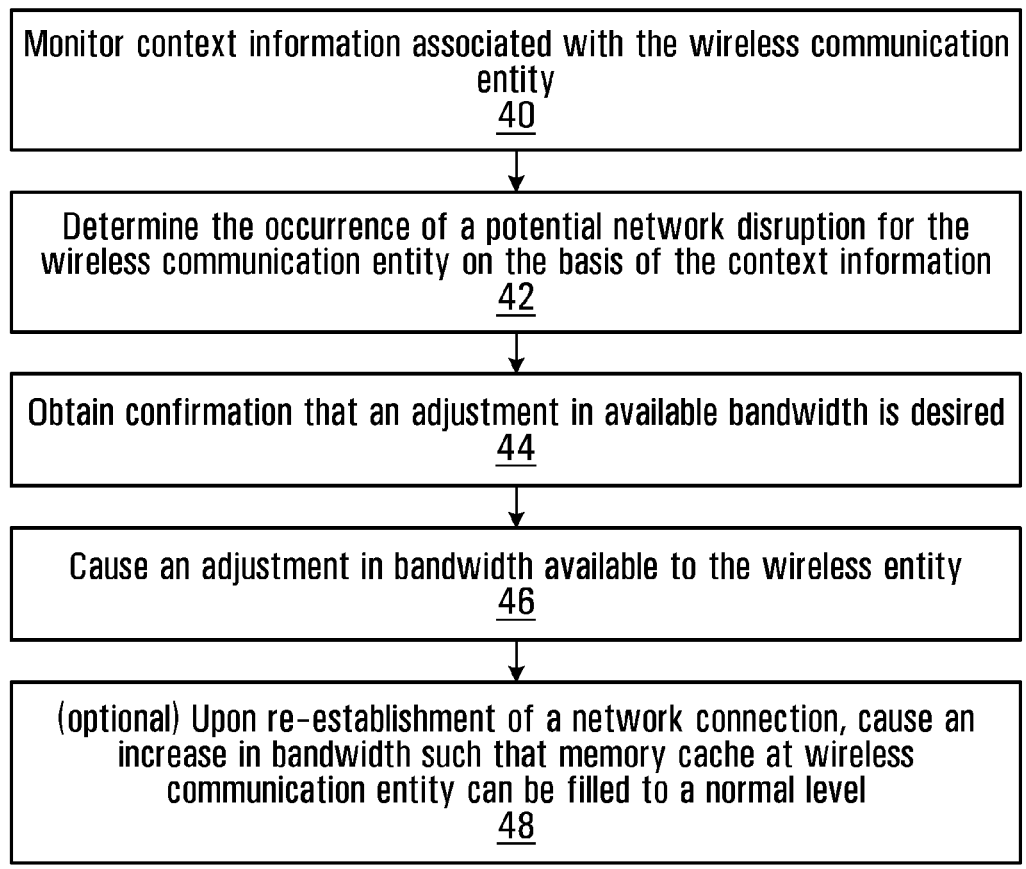
FIG. 3 shows a flow diagram of a first non-limiting method for reducing service interruptions in accordance with the present invention.

Shown in FIG. 3 is a flow diagram of a non-limiting method for reducing perceivable service interruption to the wireless communication entity 12 as performed by the predictive context engine 24. Although this method will be explained with reference to the wireless communication entity 12, it should be appreciated that in actuality, the predictive context engine 24 is operative for performing this method in connection with many wireless communication entities $12_{1-n}$ simultaneously.

At step 40, the predictive context engine 24 is operative for monitoring context information associated with the wireless communication entity 12. It should be appreciated that this step may be performed continually by the predictive context engine 24, however in order to simplify the system and conserve processing power, the predictive context engine 24 may only fully monitor the context information when the wireless communication entity 12 is active (i.e. connected to the network). In yet an alternative embodiment, step 40 may only be performed when the wireless communication entity 12 is in the process of performing data transfer (either uploading or downloading) over one of Networks A and B. In such an embodiment, the predictive context engine 24 may receive a signal from the base station 16 indicating that the wireless communication entity 12 has started a data transfer operative with a network entity, such as the content media server 22. Upon receipt of such a signal, the predictive context engine 24 will commence monitoring the context information associated with that wireless communication entity 12.

The predictive context information being monitored by the predictive context engine 24 may include location information, time information, velocity information, identity information and activity information, among other possibilities. Broadly stated, context information is any information that can be used to characterize the situation of a wireless communication entity 12. The following is a more detailed description of each of the possible types of context information.

Location Information

The location information can vary greatly depending on the technology used to generate the information. In accordance with the present invention, the location information may be derived from a cellular system, a GPS system, an A-GPS system, a wireless mesh system, a WLAN-based system, UWB (Ultra Wideband) or any other system, or combination thereof which may not necessarily by RF based. In the case of a cellular type system, the wireless communication entity 12 periodically issues an RF signal to the base station controller 16 indicative of its ESN, which positions the wireless communication entity 12 in relation to its nearest base station 14. The position estimate can be made more accurate by signal strength or time delay measurements. If the wireless communications entity 12 is visible from multiple base stations multi-angulation techniques can be used. This location information derived from a cellular-type system provides an approximate civic address and/or geospatial coordinates that are accurate to within approximately 150 m at best.

In the case of a GPS system, wherein the wireless communication entity 12 is equipped with a GPS receiver for receiving a signal from a GPS or A-GPS satellite. On the basis of this satellite signal, the location information can be computed by the wireless communication entity 12. In the case of A-GPS, the cellular network provides the wireless communication entity 12 with approximate location information to speed up the calculation. Location information based on GPS coordinates are accurate to within a few meters. Alternatively, the location information can be generated by a specialized indoor system, such as UWB that can provide location information with pinpoint accuracy within a fixed environment.

As described above, the location information is preferably stored within the mobile location database 20 of the mobile service management system 18, and forwarded to the predictive context engine 24 at periodic intervals. In an alternative example, wherein the location information is derived by GPS calculation at the wireless communications entity 12, the location information can be forwarded to the predictive context engine 24 directly from the wireless communications entity 12. In yet another example, where the location information is derived from WLAN Received Signal Strength measurement at access point, the location data can be forward to the predictive context engine 24 over a LAN. In general, the location information is forwarded to the predictive context engine 24 from the entity that derived the location information. As such, the location information may be sent to the predictive context engine 24 from anyone of the wireless communication entity 12, the base stations 14, the base station controller 16 or a server in the network.

Time Information

In general, a time stamp is associated with the location data. This time information is also considered context information associated with the wireless communication entity 12.

The time information can be generated in a variety of ways. In accordance with a non-limiting example, the time information is generated by historically time-stamping events, such as the generation of location information associated with the wireless communication entity 12. In this manner, the location of the wireless communication entity 12 is known for a given point in time. In order to time-stamp an event, time protocols, such as NTP (network time protocol), DAYTIME, and TIME can be used.

The location information may be time-stamped by the mobile service management system 18 in the case where the location information is stored in the mobile location database 20. In the case where the location information is calculated at the wireless communication entity 12 on the basis of a signal received from a GPS or A-GPS satellite, the signal from each GPS satellite contains accurate time information. Or the location information may be time-stamped by the predictive context engine 24, in the case where the location information is sent directly to the predictive context engine 24 from the cellular network server, among other possibilities.

Velocity Information

In accordance with a non-limiting example, the velocity information includes a velocity vector associated with the movement of the wireless communication entity 12. On the basis of the velocity vector, the predictive context engine 24 knows the speed and direction of travel of the wireless communication entity 12. This velocity vector can be derived based on two or more time-stamped location events. More specifically, based on the time-stamped location events, the distance and direction traveled over a given period of time can be computed, thus giving a velocity vector associated with that wireless communication entity. The actual processing operations required to compute the velocity vector would be known to one of skill in the art and as such will not be described in more detail herein.

In accordance with a first example of implementation, the velocity vector is derived at the base station controller 16 each time new location information is received from the wireless communication entity 12. This velocity information is then provided to the predictive context engine 24 once computed. However, in an alternative embodiment, only the time-stamped location events are forwarded to the predictive context engine 24, such that it is the predictive context engine 24 that derives the velocity vector associated with the wireless communication entity 12. In yet a further alternative, the velocity information is computed at the wireless communication entity 12. For example, in the case where the wireless communication entity computes the location information on the basis of one or more signals that include accurate time information from a GPS satellite, the wireless communication entity 12 is further operative for calculating the velocity information.

Identity Information

The identity information corresponds to an individual wireless communication entity 12. For example, the identity information may be a SIM (Subscribe Identity Module) card, an ESN (Electronic Serial Number), or a telephone number associated with the wireless communication entity 12. In alternative embodiments the identity information may be kept in an RFID tag (either active or passive) which is read via the wireless communication entity 12. Such an RFID tag can be included on or in the wireless communication entity.

In other non-limiting examples, the wireless communication entity 12 may be configured to obtain biometric information, such as a fingerprint or retinal scan, from a user of the wireless communication entity 12. As such, prior to using the wireless communication entity 12, a user would need to provide the wireless communication entity 12 with biometric information in order to login and configure the wireless communication entity 12. In such an embodiment, the wireless communication entity 12 would include user authentication capabilities, for confirming that the user of the communication entity 12 is in fact an authorized user.

In a further non-limiting embodiment, the biometric information may also be associated with certain user/service configuration information, such that on the basis of the biometric information, the wireless communication entity 12 will determine the service profile associated with the given user. The given service profile may specify how the user would like certain services, such as bandwidth management, to be handled.

Activity Information

The activity information can include information such as current bandwidth utilization, current data transfer activities, current services that are being subscribed to as well as user preferences. User preferences may include a user's preferred network provider, or a preferred download rate, among other possibilities.

This activity information may be used by the predictive context engine 24 in order to determine what actions to take in the case where the potential occurrence of a network disruption is detected. For example, in the case where the predictive context engine 24 determines that the wireless communication entity 12 will soon have to switch networks, and there is the choice between two new networks, the predictive context engine may cause the new network connection to be established in accordance with user preferences.

Figure 4:
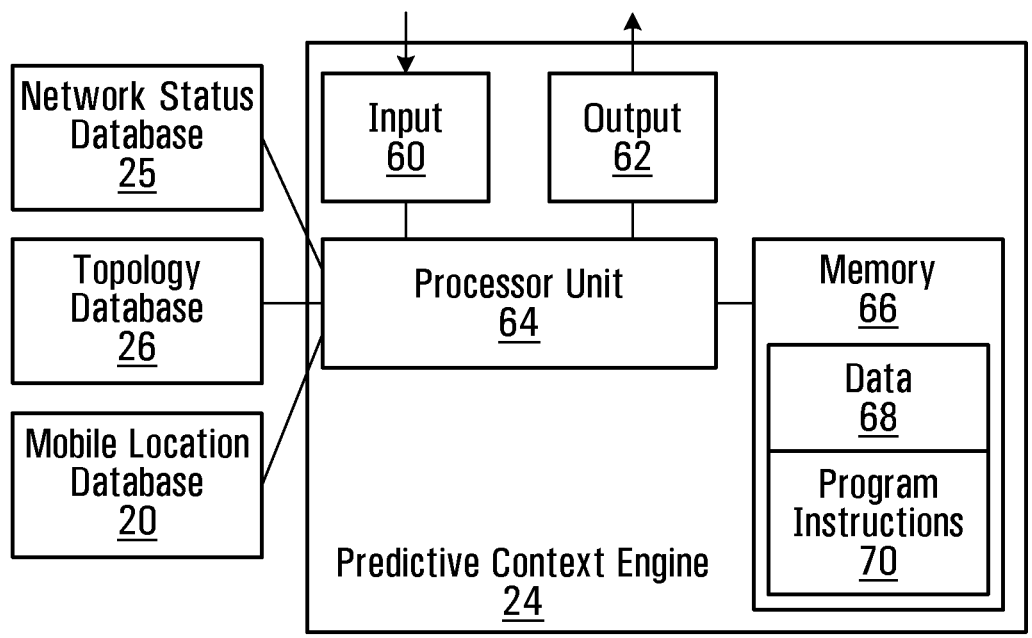
FIG. 4 shows a non-limiting block diagram of the functional components of the predictive context engine shown in the wireless communication system of FIG. 1

As described above, at least some of the context information may be provided to the predictive context engine 24 from network servers. Alternatively, some or all of the context information may be sent directly to the predictive context engine 24 from the wireless communication entity 12 or from other external entities (not shown) able to provide context information in a format that can be read by the predictive context engine 24 and associated to the wireless communications entity 12. Shown in FIG. 4 is a non-limiting functional block diagram of a predictive context engine 24 in accordance with the present invention.

The predictive context engine 24 includes an input 60, an output 62 and a processing unit 64 that is in communication with a memory unit 66. In accordance with a non-limiting example of implementation, the context information described above is received by the predictive context engine 24 via the input 60 and is passed to the processing unit 64 for processing. The memory unit 66 is operative for storing data 68 and program instructions 70 for implementing the method described herein. The processing unit 64 is operative to process the context information on the basis of the data 68 and program instructions 70 stored in the memory 66. The program instructions 68 may be stored on a medium which is fixed, tangible and readable directly by the processing unit 64 (e.g., removable diskette, CD-ROM, ROM, RAM, USB key or fixed disk). Alternatively, the program instructions 68 may be stored remotely but transmittable to the predictive context engine 24 via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes). Each of the functional entities 60, 62, 64 and 66 may be implemented using suitable hardware, firmware, software, control logic, or a combination thereof.

Referring back to FIG. 3, at step 42, the predictive context engine 24 determines the potential occurrence of a network disruption for the wireless communication entity 12, at least in part on the basis of the context information associated with the wireless communication entity 12. It should be appreciated that although steps 40 and 42 are shown sequentially, in reality, the predictive context engine 24 performs steps 40 and 42 in parallel.

In accordance with a non-limiting example, the predictive context engine 24 uses the location and velocity vector information, in combination with geographical information associated with the region covered by the one or more networks, in order to determine the potential occurrence of a network disruption for the wireless communication entity 12. As shown in FIGS. 1 and 4, the predictive context engine 24 is in communication with a topology database 26, which includes information associated with geographical characteristics of the region covered by the wireless communication system 10. As described above, the topology database 26 may include information indicative of regions of no-coverage, such as tunnels, as well as the boundaries associated with each of the networks A and B. It should be appreciated that the topology database 26 may be located remotely from the predictive context engine 24, as shown in FIGS. 1 and 4, or alternatively may be stored within the memory unit 66 of the predictive context engine 24.

In accordance with a non-limiting example of implementation, the predictive context engine 24 is operative to process the context information associated with the wireless communication entity 12 on the basis of the information contained in the topology database 26 for determining whether there is a potential occurrence of a network disruption to the wireless communication entity 12. For the sake of example, in the case where the wireless communication entity 12 is travelling in the direction indicated by arrow 13, shown in FIG. 1, the predictive context engine 24 will most likely determine that there is a potential occurrence of a network disruption for the wireless communication entity 12. More specifically, the predictive context engine 12 will process the location and velocity information associated with the wireless communication entity 12 on the basis of the information contained within the topology database 26, will determine that the wireless communication entity 12 is approaching the boundary between Network A and Network B, which could result in a potential network disruption. The processing of the context information can be performed on the basis of program instructions and rule sets contained in the memory unit 66 of the predictive context engine 24.

In accordance with a further non-limiting example of implementation, the predictive context engine 24 does not use geographical information for determining a potential occurrence of a network disruption. Instead, the predictive context engine 24 may determine the potential occurrence of a network disruption strictly on the basis of the context information. For example, in the case where the context information includes activity information indicative that the mobile service management system 18 has determined that a higher quality stream of the same media content is available on another network, the predictive context engine 24 may determine that the user is about to switch networks. This switch in network services qualifies as a network disruption.

In the case where the predictive context engine 24 has determined at step 42 that there is the potential occurrence of a network disruption, it causes an adjustment in the bandwidth available to the wireless communication entity 12. However, in accordance with a non-limiting example of implementation, prior to causing the bandwidth to be adjusted, the predictive context engine 24 proceeds to step 44 shown in FIG. 3, which is to obtain confirmation that the wireless communication entity 12 desires that the bandwidth be adjusted. As described above, adjusting the bandwidth may be done by adjusting the network priority or by improving the QoS provided to the wireless communication entity 12. Obtaining confirmation that an adjustment in bandwidth is desired can be done in at least two ways.

In accordance with a first non-limiting embodiment, the step of obtaining confirmation that an adjustment in priority or bandwidth is desired can be achieved by causing the user of the wireless communication entity 12 to actively confirm that they desire an adjustment in available bandwidth. This may be done by querying the user via a user interface on the wireless communication entity 12, among other possibilities.

In accordance with a second non-limiting embodiment, the step of obtaining confirmation that an adjustment in bandwidth or priority is desired can be achieved by checking the user preferences, or services subscribed to, stored in the mobile location database 20. For example, the user preferences may specify that in the case of a potential network disruption, the user of the wireless communication entity 12 always desires an adjustment in available bandwidth. Alternatively, the user preferences may indicate that only in the case where the wireless communication entity 12 is moving towards a more inexpensive network, should the bandwidth or priority be adjusted. It should be appreciated that the adjustment of available bandwidth or priority may be dependent on a variety of different factors specified by the user, such as cost, quality, schedule, time of day, etc. As such, the adjustment of bandwidth or priority is not solely dependent on the context information, but also on user preferences and configurations.

Once the predictive context engine 24 has received confirmation that an adjustment in bandwidth or priority is desired, the predictive context engine 24 proceeds to step 46. At step 46 the predictive context engine causes an adjustment in bandwidth available for data transfer involving the wireless communication entity 12.

The step of causing an adjustment in bandwidth involves both determining what level of bandwidth adjustment is desired, and then negotiating the bandwidth adjustment.

In most cases, the adjustment in bandwidth is an increase in the available bandwidth, meaning that the priority of the wireless communication entity 12 is increased, or the quality of service provided to the wireless communication entity 12 is increased. However, it is also possible that the adjustment in bandwidth can be a decrease in available bandwidth. For example, in the case where the wireless communication entity 12 is moving towards a less expensive network, it may be desirable to reduce the bandwidth priority or available to the wireless communication entity 12, such that more data content can be transferred once the wireless communication entity 12 has established a connection with the less expensive network. In the case where the predictive context engine 24 has determined that the network disruption will cause a loss of connectivity, the bandwidth available to the wireless communication entity 12 may be increased such that the wireless communication entity 12 can either complete the data transfer with a network entity prior to the network disruption, or so that the wireless communication entity 12 can pre-cache a sufficient amount of data content in an internal memory. This will be described in more detail further on in the specification with reference to FIG. 5.

In order to cause an adjustment in the bandwidth available for data transfer involving the wireless communication entity 12, the predictive context engine 24 issues a signal via output 62 to the base station controller 16, the wireless communication entity 12, the switching entity 112 and the context media server 22. Based on a determination of the memory cache fill level at the wireless communication entity 12, the predictive context engine 24 determines what level of adjustment is required. Then, on the basis of this information, the predictive context engine 24 causes a negotiation/arbitration procedure to be performed between the memory cache controller 102 of the wireless communication entity 12 and the memory cache controller 114 of the context media server 22. The purpose of the arbitration procedure is to ensure the best allocation of the temporary bandwidth among the wireless communication entities 12 in the networks. In the case of possibly competing requests, the arbitration procedure may take into consideration the type and importance of data being transferred, as well as the expected time period before the network disruption for each wireless communication entity 12. Arbitration methods and procedures for allocating priority or bandwidth are known in the art, and as such will not be described in more detail herein.

As mentioned above, in the most common cases, the adjustment of bandwidth available to the wireless communication entity 12 will involve increasing the amount of bandwidth available for data transfer. This increased bandwidth allows the wireless communication entity 12 to either complete the downloading (or uploading, in some cases) of data content, or to pre-cache an increased amount of data content in an internal memory of the wireless communication entity, prior to the network disruption. In the case where a data transfer operation (i.e. a download, or upload operation) is close to being completed, the predictive context engine 24 may cause an increase in available bandwidth such that the wireless communication entity 12 simply completes the data transfer process prior to the network disruption. In an alternative embodiment, and as will be described in more detail below with respect to FIG. 5, the predictive context engine 24 may simply cause an increase in the available bandwidth, such that the wireless communication entity 12 can pre-cache a sufficient amount of data content, such that there is a reduction in the perceivable interruption to data content transfer during the network disruption.

In some cases, an increase in the bandwidth available to the wireless communication entity 12 prior to a network disruption will allow advertisements to be pushed before the wireless communication entity 12 experiences connectivity loss.

In accordance with a further non-limiting example of implementation, in addition to causing an adjustment in the bandwidth available for data transfer, the predictive context engine 24 is further operative for predicting future data that may be desired by the wireless communication entity 24, and enabling that data to be transferred to the wireless communication entity prior to the network disruption. For example, in the case where the user of the wireless communication entity 12 is in the process of checking his or her email, upon determination that a potential network disruption is imminent, the predictive context engine may preemptively cause the attachment to be transferred to the wireless communication entity 12. In this manner, if the user of the wireless communication entity 12 chooses to view the attachment during the network disruption, the attachment will be available. In a further example, in the case where the user of the wireless communication entity 12 is in the process of downloading songs in a song list, upon determination that a potential network disruption is imminent, the predictive context engine 12 may predict which songs the user will download next, and then preemptively begin the transfer of these songs to the wireless communication entity 12. More specifically, based on past song selection or the current section of a song directory being viewed, the predictive context engine 24 may predict the next song that a user will download, and commence the data transfer for that song prior to the user having selected it.

In some further examples, the predictive context engine 24 may be aware of past browsing behaviour, such that it knows the order in which a user will access different websites. In this manner, it can commence data transfer for a predicted future website, prior to the user of the wireless communication entity having asked for that new website. In this manner, the information will be pre-loaded, such that it is available to the user even if there is a period of network disruption.

As will be described in more detail below, following a network disruption, the predictive context engine 24 may proceed to step 48, wherein upon re-establishment of a network connection, an increase in bandwidth is once again provided to the wireless communication entity 12 such that a buffer at the memory cache controller 102 can be re-filled to the level it was at prior to the network disruption.

Figure 5:
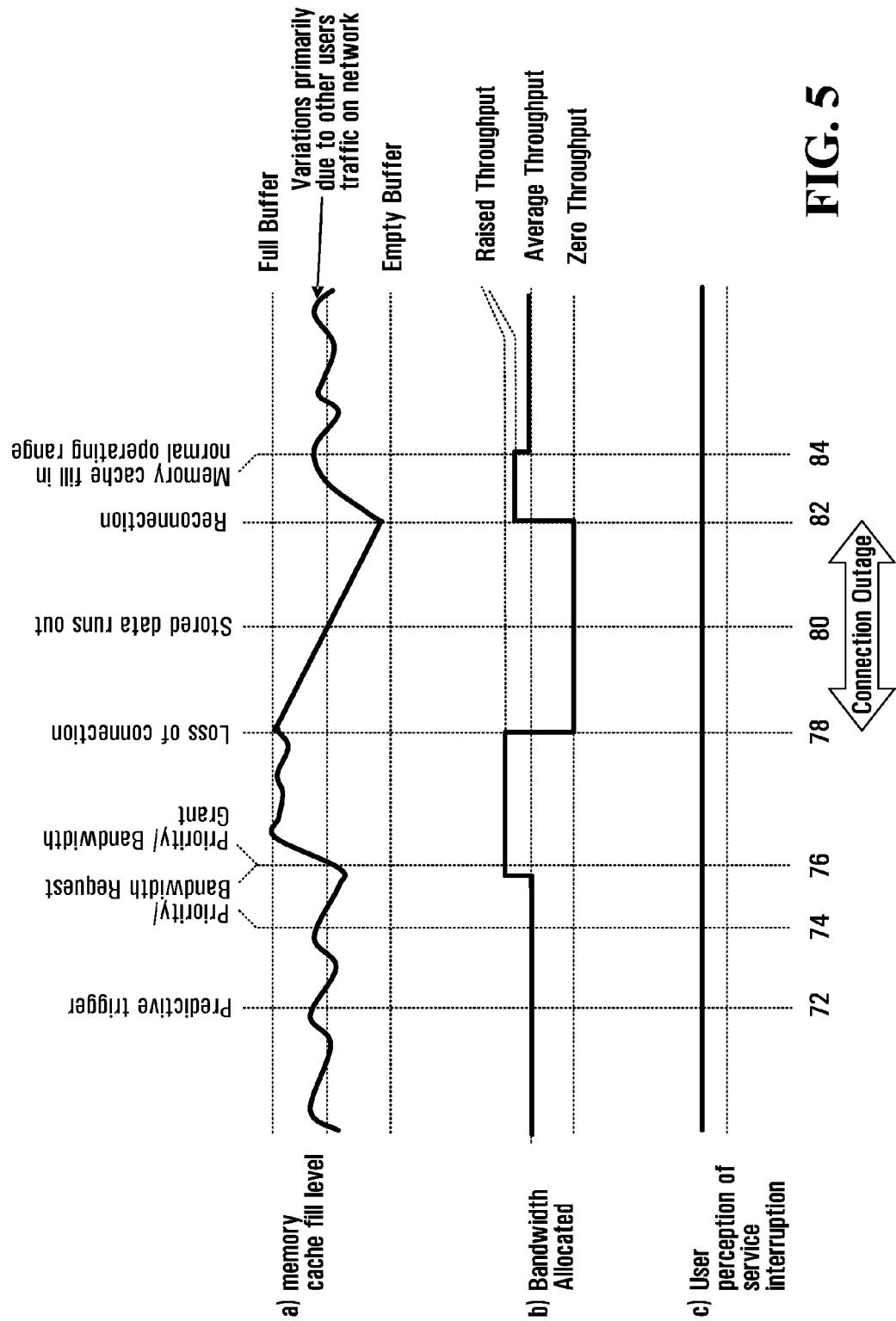
FIG. 5 shows a non-limiting graphical representation of a) the content stored in a memory cache of the wireless communication entity 12; b) the bandwidth available to the wireless communication entity; and c) the user perception of service interruption leading up to, and during, a network disruption.

Shown in FIG. 5 is a non-limiting graphical representation of a) the content stored in the memory cache 100 of the wireless communication entity 12; b) the level of bandwidth available to the wireless communication entity; and c) the user perception of data content interruption leading up to, and during, a network disruption. For the purposes of this example, the network disruption is a loss in connectivity with a network entity. At position 72, the predictive context engine 24 determines that there is a potential occurrence of a network disruption for the wireless communication entity 12. At this position, the amount of data content contained in the memory cache 100 of the wireless communication entity hovers around a level that is appropriate for typical data transfer activity. It should be noticed, however, that the level of data content varies slightly due to changes in wireless network load associated with other user traffic. More specifically, if the bandwidth available to the wireless communications entity 12 is set for the average needs of the service, there will be periods when no data is arriving followed by periods when enough data arrives to compensate for the period without data. Overall, the level of content remains relatively steady at a normal operating level. The memory cache 100 is sufficient to handle these normal state variations. As such, the amount of data content contained in the memory cache 100 of the wireless communication entity 12 varies normally around a value well in the middle range of the memory cache 102, and the bandwidth available for data content transfer with the network also remains steady.

Line b shows that the bandwidth associated with a particular service for data content transfer with the wireless communication entity 12 is relatively constant when the predictive trigger is detected. At position 74, in light of the detection of a potential network disruption, the predictive context engine 24 requests an increase in priority and/or quality of service for the bandwidth supplied to the wireless communication entity 12 from the base station controller 16. At this step, the predictive context engine 12 further facilitates any arbitration procedure that is necessary.

At position 76, the arbitration procedure has been completed, and the request for additional priority and or bandwidth has been granted. As such, as shown by line b, there is an increase in the available bandwidth for data transfer involving the wireless communication entity 12. This increase in available bandwidth results in an increase in the rate of data transferred to the wireless communication entity 12, such that as shown in line a, the amount of data content stored in the memory cache 100 of the wireless communication entity 12 increases until the buffer is nearly full when the wireless communications entity will slow down data reads. With the greater priority and/or increased QoS for the available bandwidth, as soon as the levels in the memory cache controller 102 begin to fall the data flow can be rapidly increased to refill the memory buffer again. This results in the memory cache 102 being kept almost full with much smaller cycles due to other user load variations. In other words, the wireless communication entity 12 pre-caches data content such that the pre-cached data can be used during a potential network disruption.

In a heavily used network giving a higher priority to the wireless communications entity 12 when it is likely to be exposed to communications disruptions will imply a lower throughput to other wireless communication entities. Therefore, increasing the memory cache in the wireless communication entity 12 may result in a corresponding memory cache depletion in other wireless communication entities. However the amount of associated depletion in each of the other wireless communications entity will be divided by the number of those other wireless communication entities, such that each one of the other wireless communication entities will not experience a significant depletion. However, due to this depletion, it is recommended that the bandwidth supplied to the wireless communication entity 12 is returned to normal as soon as the risk of communications disruption has passed.

At position 78, the network disruption occurs, which in this example is a dead period for data transfer caused by either a no-coverage zone or a bad handover procedure from Network to Network. During the dead period, there is zero throughput of data transfer, as indicated by line b). However, during this dead period, the user of the wireless communication entity 12 continues to watch and/or listen and/or interact with the data content that has been pre-cached in an internal memory of the wireless communication entity 12. For example, the user may continue to fill in an interactive form or set of nested forms. As shown by line a) between periods 78 and 80, the amount of data content stored in the memory buffer decreases during the dead period, given that a user continues to watch/and or listen and/or interact with the data content that has been pre-cached, but no new data content is being transferred to the wireless communication entity 12. As shown by line c), during this dead period, there is no noticeable disruption to the data content as perceived by the user, regardless of the fact that it is a dead period. As shown by line a), at position 80, the dead period for data transfer is still in effect, and the fill level of the memory cache 102 dips below its standard buffer of stored data content. At position 82, the wireless communication entity re-establishes a network connection, and data transfer with the network re-commences. It should be appreciated that in the case where the network disruption occurred due to a no-coverage zone, such as within a tunnel, for example, the newly established network connection may be with the same network as prior to the network disruption. Alternatively, in the case where the network disruption occurred due to a handover procedure between networks, the newly established network connection may be with a different network than prior to the network disruption.

Optionally, at position 82, once a new network connection has been established, the predictive context engine 24 may cause an increase in bandwidth available to the wireless communication entity 12 such that a sufficient amount of data transfer can occur so as to re-fill the buffer in the memory cache controller 102 to its pre-disruption level. In the case where the wireless communication entity 12 does not receive an increase in available bandwidth following a network disruption, such that the level of data content stored in the member buffer hovers around empty, normal variations in data delivery could result in for a short time the data buffer being emptied even further, possibly to the point when data runs out. This could result in the user detecting a disruption in data content services.

As shown by line c) of FIG. 5, during the period leading up to, as well as during the network disruption, there was no discernable interruption to the data content/media stream being provided to the user of the wireless communication entity 12. From a user's perspective, the pre-caching of data content provides a seamless transition in data transfer services from one network to the next, or during travel through a no-coverage zone. This is due to the fact that the increase in bandwidth during the window of time between positions 76 and 78 was sufficient to pre-cache enough data content to last throughout the duration of the network interruption.

The window of time during which there is increased bandwidth available for data transfer involving the wireless communication entity (i.e. for the period between positions 76 and 78) may vary depending on the expected duration of the network interruption. For example, if the predictive context engine 24 knows based on the location and velocity vector information associated with the wireless communication entity 12 that the wireless communication entity 12 is heading towards a tunnel 12 that causes a no-coverage period of approximately 20 seconds, then the predictive context engine 24 can ensure that the period of increased bandwidth (i.e. the period of time between positions 76 and 78) is sufficient to ensure that there is pre-cached 20 seconds of media content. Likewise, in the case where predictive context engine 24 knows that the wireless communication entity 12 is heading towards a boundary of a network that generally requires a 3 second handover procedure to switch between networks, then the predictive context engine 24 can ensure that the period of increased bandwidth (i.e. the period of time between positions 76 and 78) is sufficient to ensure that there is enough pre-cached media content for 3 seconds. In other words, the predictive context engine 24 can adjust the length of time for the requested increase in bandwidth.

Method Performed by Wireless Communication Entity

In accordance with a further non-limiting example of implementation, the wireless communication system 10 does not include a predictive context engine 24, and instead the method described above with respect to FIG. 3 is performed by the wireless communication entity 12 itself.

Figure 6:
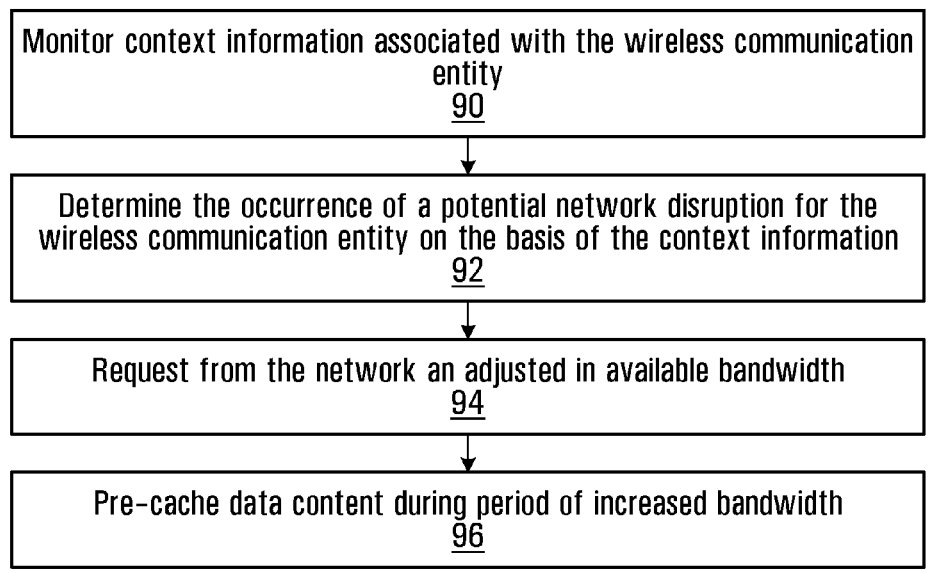
FIG. 6 shows a flow diagram of a second non-limiting method for reducing service interruptions in accordance with the present invention.

Shown in FIG. 6 is a non-limiting example of a flow diagram of a method for monitoring the context information associated with the wireless communication entity 12 and for causing an adjustment in the bandwidth available for data transfer involving the wireless communication entity 12, as performed by the wireless communication entity 12.

At step 90, the wireless communication entity 12 monitors context information associated with its location, velocity, and activity. In terms of the location information, the wireless communication entity 12 may include a GPS or A-GPS receiver, for calculating GPS location coordinates. Alternatively, the wireless communication entity 12 may receive a signal periodically from its closest base station indicative of location information. The location information can be time-stamped upon receipt at the wireless communication entity 12. Based on the location information and time information, the wireless communication entity 12 can derive velocity information in the same manner as described above with respect to the predictive context engine 24. Given that each wireless communication entity 12 is responsible for monitoring its own context information, identity information may not necessarily be monitored.

It should be appreciated that step 90 of monitoring the context information may be performed continually by the wireless communication entity 12, or alternatively, the wireless communication entity 12 may only commence monitoring its context information when it is actively connected to the network.

At step 92, the wireless communication entity 12 determines the potential occurrence of a network disruption, at least in part on the basis of its context information. It should be appreciated that although steps 90 and 92 are shown sequentially, in reality, the wireless communication entity 12 is operative for continually performing steps 90 and 92 in parallel.

In accordance with a non-limiting example, the wireless communication entity 12 uses the location and velocity vector information, in combination with geographical information associated with the region covered by the one or more networks, in order to determine the potential occurrence of a network disruption. Although not shown in the Figures, the wireless communication entity 12 can include geography information stored in an internal memory. This geography information includes geographical characteristics associated with the region in which the wireless communication entity 12 is located. For example, the geographical information may include information indicative of regions of no-coverage, such as tunnels, as well as the boundaries associated with each of the networks.

In accordance with a first non-limiting example, the geographical information may be included within the memory of the wireless communication entity 12 at the time of purchase. Alternatively, geographical information may be automatically downloaded to the wireless communication entity 12 each time the wireless communication entity 12 enters a new geographical region. In this manner, the wireless communication entity 12 does not need to store large amounts of information at all times. Instead, the geographical information stored in an internal memory of the wireless communication entity 12 may continually be over-written each time the wireless communication entity 12 moves location. In this manner, only geographical information that is directly relevant to the wireless communication entity 12 at that time is stored in an internal memory.

In accordance with a first non-limiting example, during step 92, the wireless communication entity 12 is operative for processing its context information on the basis of the geographical information for determining whether there is a potential occurrence of a network disruption. As described previously, in the case where the context information is indicative that the wireless communication entity 12 is moving towards a no-coverage zone, or the boundary of a network, the wireless communication entity 12 may determine that there is a potential occurrence of a network disruption. The manner in which the wireless communication entity 12 processes the context information on the basis of the geographical information is determined at least in part by program instructions and rule sets also stored in its internal memory.

In an alternative example of implementation, the wireless communication entity 12 does not use geographical information for determining a potential occurrence of a network disruption. Instead, the wireless communication entity 12 determines the potential occurrence of a network disruption strictly on the basis of its activity information, and information associated with certain characteristics of one or more networks. For example, in the case where the wireless communication entity 12 receives information from the mobile service management system 18 indicative that there is a higher quality stream of the same media content available on another network, or there is the availability of a cheaper alternative network, the wireless communication entity 12 will determine that there is the potential occurrence of a network disruption.

At step 94, once the wireless communication entity 12 has determined that there is a potential occurrence of a network disruption, the wireless communication entity requests an adjustment in available bandwidth from the mobile service management system 18. More specifically, the wireless communication entity 12 issues a signal to base station controller 16 and the switching entity 112 for causing more or less bandwidth to be available to the wireless communication entity 12. In accordance with a non-limiting embodiment, the exchange of signals between the wireless communication entity 12 and the base station controller 16 and the switching entity 112 includes a negotiation/arbitration procedure. More specifically, on the basis of the memory cache fill level in the memory cache controller 102, the wireless communication entity 12 determines what level of adjustment in the available bandwidth is required. Then, on the basis of this information, the memory cache controller 102 performs a negotiation/arbitration procedure with the memory cache controller 114 of the context media server 22, via the base station controller 16. The base station controller 16 ensures that the allocation of the temporary bandwidth is distributed appropriately among the wireless communication entities $12_{1-n}$ in the networks. Arbitration methods and procedures for allocating bandwidth are known in the art, and as such will not be described in more detail herein.

In the most common cases, the adjustment of bandwidth available to the wireless communication entity 12 will involve increasing the amount of bandwidth available for data transfer. However, in certain cases, the adjustment of available bandwidth may involve decreasing the bandwidth available for data transfer. For example, in the case where the wireless communication entity 12 is moving into a region covered by a less expensive network, the wireless communication entity 12 may request that the adjustment in available bandwidth be a decrease in available bandwidth. In this manner, the wireless communication entity 12 can wait until it has switched to the cheaper network before downloading the bulk of the data content.

At step 96, in the case where the adjustment in available bandwidth is an increase in available bandwidth, the wireless communication entity 12 is able to either complete the downloading (or uploading, in some cases) of information prior to the network disruption, or pre-cache an increased amount of data content in an internal memory.

As described above with respect to FIG. 5, by pre-caching an increase in data content in the internal memory of the wireless communication entity 12, this data content can be viewed and/or listened to and/or interacted with by the user of the wireless communication entity 12 during the period of network disruption. In this manner, there is no perceivable interruption in the data transfer detected by a user of the wireless communication entity 12.

Although the present invention has been described in considerable detail with reference to certain preferred embodiments thereof, variations and refinements are possible without departing from the spirit of the invention. Therefore, the scope of the invention should be limited only by the appended claims and their equivalents.

The invention claimed is:

1. A method, comprising:
   a) monitoring context information associated with a wireless communication entity for determining a potential occurrence of a network disruption;
   b) upon determining a potential occurrence of a network disruption, causing adjustment of bandwidth available for data transfer involving the wireless communication entity for adjusting a rate at which content is transferred to a memory cache at the wireless communication entity in preparation of the potential occurrence of the network disruption.

2. A method as defined in claim 1, wherein causing adjustment of bandwidth includes adjusting a network priority associated with the wireless communication entity.

3. A method as defined in claim 1, wherein upon determining a potential occurrence of a network disruption, causing an increase in the bandwidth available for data transfer involving the wireless communication entity.

4. A method as defined in claim 1, further comprising obtaining user confirmation that that an adjustment of bandwidth is desired, prior to causing the adjustment of bandwidth available for data transfer involving the wireless communication entity.

5. A method as defined in claim 1, further comprising performing a bandwidth arbitration procedure in order to cause increased bandwidth to be available for data transfer involving the wireless communication entity.

6. A method as defined in claim 3, further comprising causing a memory cache at the wireless communication entity to increase the amount of content stored therein, when an increase in the bandwidth available for data transfer involving the wireless communication entity is caused.

7. A method as defined in claim 6, wherein upon the occurrence of a network disruption, causing the wireless communication entity to use the content stored in the memory cache during at least a portion of a duration of the network disruption.

8. A method as defined in claim 1, comprising establishing a new network connection following the occurrence of the network disruption.

9. A method as defined in claim 8, comprising causing an increase in the bandwidth available for data transfer involving the wireless communication entity upon establishment of a new network connection, so as to replenish the memory cache of the wireless communication entity.

10. A method as defined in claim 8, wherein the new network connection is established with the same network.

11. A method as defined in claim 8, wherein the new network connection is established with a different network.

12. A method as defined in claim 1, wherein the context information includes information selected from the set consisting of location information, velocity information, activity information and time information.

13. A method as defined in claim 1, wherein the potential occurrence of a network disruption is an anticipated switch between networks.

14. A method as defined in claim 1, wherein the potential occurrence of a network disruption is the anticipation of the wireless communication entity entering a no-coverage zone.

15. A method as defined in claim 1, wherein the wireless communication entity is one of a cellular telephone, a PDA and a smartphone.

16. A predictive context entity comprising:
   a) a first functional unit for receiving over a network a first signal indicative of context information associated with a wireless communication entity;
   b) a second functional unit for processing the first signal indicative of context information associated with the wireless communication entity to determine the potential occurrence of a network disruption to the wireless communication entity;
   c) a third functional unit for issuing a second signal, upon determining a potential occurrence of a network disruption, for causing adjustment of bandwidth available for data transfer involving the wireless communication entity, for adjusting a rate at which content is transferred to a memory cache at the wireless communication entity in preparation of the potential occurrence of the network disruption.

17. A predictive context entity as defined in claim 16, wherein causing adjustment of bandwidth includes adjusting a network priority associated with the wireless communication entity.

18. A predictive context entity as defined in claim 16, wherein causing adjustment of bandwidth available for data transfer involving the wireless communication entity includes causing an increase in the bandwidth available for data transfer involving the wireless communication entity.

19. A predictive context entity as defined in claim 16, wherein causing adjustment of bandwidth available for data transfer involving the wireless communication entity includes causing an increase in the bandwidth available for data transfer between the wireless communication entity and a content media server.

20. A predictive context entity as defined in claim 16, wherein said context information includes information indicative of a location associated with the wireless communication entity.

21. A predictive context entity as defined in claim 20, wherein said second functional unit is operative for processing the information indicative of location for generating a velocity vector associated with the wireless communication entity.

22. A predictive context entity as defined in claim 16, wherein said context information includes information indicative of a velocity vector associated with the wireless communication entity.

23. A predictive context entity as defined in claim 16, wherein said second functional unit is operative to process said context information at least in part on the basis of topology information for determining the potential occurrence of a network disruption to the wireless communication entity.

24. A predictive context entity as defined in claim 16, wherein the potential occurrence of a network disruption is an anticipated switch between networks.

25. A predictive context entity as defined in claim 16, wherein the potential occurrence of a network disruption is the anticipation of the wireless communication entity entering a no-coverage zone.

26. A predictive context entity as defined in claim 16, wherein upon determination of a potential occurrence of a network disruption to the wireless communication entity, causing said wireless communication entity to confirm a desire for an adjustment in bandwidth for data transfer.

27. A predictive context entity as defined in claim 16, wherein upon determination of a potential occurrence of a network disruption to the wireless communication entity, verifying user preferences associated with said wireless communication entity for determining whether to cause an adjustment in bandwidth for data transfer involving the wireless communication entity.

28. A predictive context entity as defined in claim 16, wherein upon determination of a potential occurrence of a network disruption said third functional unit is operative for causing an arbitration procedure to be performed, so as to cause increased bandwidth to be available for data transfer involving the wireless communication entity.

29. A predictive context entity as defined in claim 16, wherein following a network disruption, said third functional entity is operative for causing an increase in the bandwidth available for data transfer involving the wireless communication entity and a new network connection, so as to replenish the memory cache of the wireless communication entity.

30. A predictive context entity as defined in claim 16, wherein the wireless communication entity is one of a cellular telephone, a PDA and a smartphone.

31. A predictive context entity as defined in claim 16, wherein said predictive context entity is operative for receiving context information associated with multiple wireless communication entities.

32. A system comprising:
   a) a wireless communication entity comprising:
      i) a transceiver suitable for establishing a wireless communication link, said wireless communication link being suitable for permitting data transfer between a network and said wireless communication entity;
   b) a predictive context engine comprising:
      i) a first functional unit for receiving over a network a signal indicative of context information associated with said wireless communication entity;
      ii) a second functional unit for processing the signal indicative of the context information associated with said wireless communication entity to determine the potential occurrence of a network disruption involving the wireless communication entity;
      iii) a third functional unit for issuing a signal, upon determining a potential occurrence of a network disruption, for causing adjustment of bandwidth available for data transfer involving the wireless communication entity, for adjusting a rate at which content is transferred to a memory cache at the wireless communication entity in preparation of the potential occurrence of the network disruption.

33. A system as defined in claim 32, wherein causing adjustment of bandwidth includes adjusting a network priority associated with said wireless communication entity.

34. A system as defined in claim 32, wherein said wireless communication entity is operative for issuing over a network a signal from which context information associated with said wireless communication entity can be derived.

35. A system as defined in claim 32, wherein upon determining a potential occurrence of a network disruption said third functional unit is operative for causing an increase in the bandwidth available for data transfer involving the wireless communication entity.

36. A system as defined in claim 35, wherein upon determining a potential occurrence of a network disruption, said third functional unit is operative for causing an increase in the bandwidth available for data transfer between the wireless communication entity and a content media server over said wireless communication link.

37. A system as defined in claim 32, wherein upon determination of a potential occurrence of a network disruption to said wireless communication entity, said third functional unit is operative for causing a confirmation signal to be issued to said wireless communication entity for prompting a user of said wireless communication entity to confirm a desire for an adjustment in bandwidth for data transfer.

38. A system as defined in claim 32, wherein upon determination of a potential occurrence of a network disruption to the wireless communication entity, said third functional unit is operative for verifying user preferences associated with said wireless communication entity for determining whether to cause an adjustment in bandwidth for data transfer involving the wireless communication entity.

39. A system as defined in claim 32, wherein upon determination of a potential occurrence of a network disruption to the wireless communication entity, said third functional unit being operative for causing an arbitration procedure to be performed, so as to cause increased bandwidth to be available for data transfer involving the wireless communication entity.

40. A system as defined in claim 32, wherein said memory cache of said wireless communication entity increases the amount of content stored therein when an increase in the bandwidth available for data transfer involving the wireless communication entity is caused.

41. A system as defined in claim 32, wherein upon the occurrence of a network disruption, said wireless communication entity being operative to use the content stored in said memory cache during at least a portion of a duration of the network disruption.

42. A system as defined in claim 41, wherein following a network disruption, said third functional entity is operative for causing an increase in the bandwidth available for data transfer involving the wireless communication entity and a new network connection, so as to replenish the memory cache of the wireless communication entity.

43. A system as defined in claim 42, wherein the new network connection is established with the same network.

44. A system as defined in claim 42, wherein the new network connection is established with a different network.

45. A system as defined in claim 32, wherein said context information includes information indicative of a location associated with said wireless communication entity.

46. A system as defined in claim 45, wherein said second functional unit is operative for processing the information indicative of location for generating a velocity vector associated with said wireless communication entity.

47. A system as defined in claim 32, wherein said context information includes information indicative of a velocity vector associated with the wireless communication entity.

48. A system as defined in claim 32, wherein said second functional unit is operative to process said context information at least in part on the basis of topology information for determining the potential occurrence of a network disruption to the wireless communication entity.

49. A system as defined in claim 32, wherein the potential occurrence of a network disruption is an anticipated switch between networks.

50. A system as defined in claim 32, wherein the potential occurrence of a network disruption is the anticipation of the wireless communication entity entering a no-coverage zone.

51. A system as defined in claim 32, wherein the wireless communication entity is one of a cellular telephone, a PDA and a smartphone.

52. A system as defined in claim 32, wherein said predictive context entity is operative for receiving context information associated with multiple wireless communication entities.

53. A wireless communication entity comprising:
 a) means for establishing a wireless communication link, said wireless communication link being suitable for permitting data transfer between a network and said wireless communication entity;
 b) means for issuing over a network, a signal from which context information associated with said wireless communication entity can be derived;
 c) upon a determination from the context information of a potential occurrence of a network disruption to said wireless communication entity, means for receiving an adjustment of bandwidth available for data transfer with the network for adjusting a rate at which content is transferred to a memory cache at the wireless communication entity in preparation of the potential occurrence of the network disruption.

54. A wireless communication entity as defined in claim 53, wherein receiving an adjustment of bandwidth includes receiving a change in priority.

55. A wireless communication entity as defined in claim 53, wherein said signal from which context information associated with said wireless communication entity can be derived includes information indicative of a unique identifier associated with said wireless communication entity.

56. A wireless communication entity as defined in claim 53, wherein said means for receiving an adjustment of bandwidth receive an increase in the bandwidth available for data transfer with the network upon a determination of a potential occurrence of a network disruption.

57. A wireless communication entity as defined in claim 53, wherein the network is the internet.

58. A wireless communication entity as defined in claim 53, wherein said wireless communication link is operative for permitting data transfer between the wireless communication entity and a content media server.

59. A wireless communication entity as defined in claim 53, wherein upon determination of a potential occurrence of a network disruption said wireless communication entity further comprises means for confirming a desire for an adjustment in bandwidth for data transfer.

60. A wireless communication entity as defined in claim 53, wherein said memory cache of said wireless communication entity increases the amount of content stored therein when an increase in the bandwidth available for data transfer involving the wireless communication entity is caused.

61. A wireless communication entity as defined in claim 60, wherein upon the occurrence of a network disruption, said wireless communication entity being operative to use the content stored in said memory cache during at least a portion of a duration of the network disruption.

62. A wireless communication entity as defined in claim 53, wherein following a network disruption, said means for establishing a wireless communication link are operative for establishing a second wireless communication link.

63. A wireless communication entity as defined in claim 62, wherein the second wireless communication link is established with the same network.

64. A wireless communication entity as defined in claim 62, wherein the second wireless communication link is established with a different network.

65. A wireless communication entity as defined in claim 62, wherein upon establishment of the second communication link, said means for receiving an adjustment of bandwidth available for data transfer is operative for receiving an increase in the bandwidth available for data transfer, so as to replenish the memory cache of the wireless communication entity.

66. A wireless communication entity as defined in claim 53, wherein the context information derived includes information selected from the set consisting of location information, velocity information, activity information and time information.

67. A wireless communication entity as defined in claim 53, wherein the context information derived, is processed at least in part on the basis of topology information for determining the potential occurrence of a network disruption to the wireless communication entity.

68. A wireless communication entity as defined in claim 53, wherein the potential occurrence of a network disruption is an anticipated switch between networks.

69. A wireless communication entity as defined in claim 53, wherein the potential occurrence of a network disruption is the anticipation of the wireless communication entity entering a no-coverage zone.

70. A wireless communication entity as defined in claim 53, wherein said wireless communication entity is one of a cellular telephone, a PDA and a smartphone.

71. A nontransitory computer-readable storage medium comprising a program element for execution by a predictive context entity, the predictive context entity, when executing said program element, being operative for:
 a) receiving over a network a signal indicative of context information associated with said wireless communication entity;
 b) processing the signal indicative of the context information associated with said wireless communication entity to determine the potential occurrence of a network disruption involving the wireless communication entity;
 c) upon determining a potential occurrence of a network disruption, issuing a signal for causing adjustment of bandwidth available for data transfer involving the wireless communication entity for adjusting a rate at which content is transferred to a memory cache at the wireless communication entity in preparation of the potential occurrence of the network disruption.

72. A method, comprising:
 a) monitoring context information associated with a wireless communication entity for determining a potential occurrence of a network disruption;
 b) upon determining a potential occurrence of a network disruption:

i) predicting future data that may be desired by the wireless communication entity;

ii) causing an increase in the bandwidth available for data transfer involving the wireless communication entity such that the predicted future data desired by the wireless communication entity is pre-emptively transferred to the wireless communication entity in preparation of the potential occurrence of the network disruption.

73. A method as defined in claim 3, further comprising causing the completion of a data transfer with a network entity in preparation of the potential occurrence of the network disruption, when an increase in the bandwidth available for data transfer involving the wireless communication entity is caused.

* * * * *